(12) United States Patent
Fühling et al.

(10) Patent No.: US 6,878,185 B2
(45) Date of Patent: Apr. 12, 2005

(54) METHOD FOR SEPARATING FUEL VAPOUR-AIR MIXTURES AND DEVICE FOR CARRYING OUT SAID METHOD

(75) Inventors: Stefan Fühling, Dortmund (DE); Knut Meyer, Essen (DE); Martin Nockemann, Dortmund (DE)

(73) Assignee: Siemens Aktiengesellschaft, Munich (DE)

( * ) Notice: Subject to any disclaimer, the term of this patent is extended or adjusted under 35 U.S.C. 154(b) by 116 days.

(21) Appl. No.: 10/204,044

(22) PCT Filed: Feb. 15, 2001

(86) PCT No.: PCT/EP01/01645

§ 371 (c)(1), (2), (4) Date: Nov. 25, 2002

(87) PCT Pub. No.: WO01/60648

PCT Pub. Date: Aug. 23, 2001

(65) Prior Publication Data

US 2003/0145728 A1 Aug. 7, 2003

(30) Foreign Application Priority Data

Feb. 18, 2000 (DE) .......................... 100 07 522

(51) Int. Cl.⁷ .......................... B01D 5/00; B01D 17/038; B01D 53/04
(52) U.S. Cl. .................................. 95/34; 95/41; 95/146; 96/136; 96/139; 96/142; 96/147; 55/315.2; 55/319; 55/459.1
(58) Field of Search .............................. 55/315.2, 318, 55/319, 338.1, 459.1; 95/34, 39, 41, 42, 146; 96/108, 139, 134–136, 140, 142, 147, 153; 123/518; 141/45, 63

(56) References Cited

U.S. PATENT DOCUMENTS

| | | | | |
|---|---|---|---|---|
| 2,562,839 A | * | 7/1951 | Winston | 96/142 |
| 3,815,327 A | * | 6/1974 | Viland | 95/220 |
| 3,913,633 A | * | 10/1975 | Hiller | 141/45 |
| 4,671,071 A | | 6/1987 | Sasaki | |
| 4,829,968 A | | 5/1989 | Onufer | |
| 4,957,520 A | * | 9/1990 | Parmentier et al. | 96/136 |
| 5,301,721 A | * | 4/1994 | Hartmann | 141/59 |
| 5,562,757 A | * | 10/1996 | Brun et al. | 96/113 |
| 5,680,848 A | * | 10/1997 | Katoh et al. | 123/518 |
| 5,738,710 A | * | 4/1998 | Omata et al. | 95/107 |
| 5,901,689 A | * | 5/1999 | Kimura et al. | 123/518 |
| 6,343,590 B1 | * | 2/2002 | Nagai et al. | 123/518 |
| 6,390,074 B1 | * | 5/2002 | Rothamel et al. | 123/519 |
| 6,599,350 B1 | * | 7/2003 | Rockwell et al. | 96/135 |

FOREIGN PATENT DOCUMENTS

| | | |
|---|---|---|
| EP | 0 936 097 | 8/1999 |
| FR | 2 724 603 | 3/1996 |
| FR | 2 728 200 | 6/1996 |
| JP | 11-093784 | 4/1999 |

* cited by examiner

*Primary Examiner*—Robert H. Spitzer
(74) *Attorney, Agent, or Firm*—Morrison & Foerster LLP

(57) ABSTRACT

The subject of the present invention is a method and a device for the separation of fuel-vapor/air mixtures into their components, in particular for purification of vapor mixtures, such as occur in fuel tanks of motor vehicles. A preseparator is arranged between the fuel tank and the filter. In the preseparator, the hydrocarbons are separated from the mixture and are supplied to the fuel tank again. The remaining mixture is supplied to the filter.

27 Claims, 3 Drawing Sheets

Figure 1:
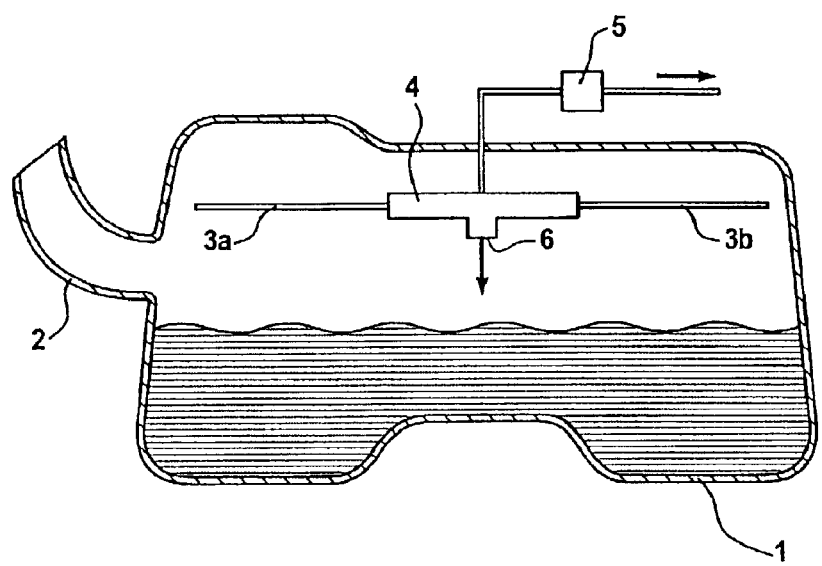

METHOD FOR SEPARATING FUEL VAPOUR-AIR MIXTURES AND DEVICE FOR CARRYING OUT SAID METHOD

The subject of the present invention is a method for the separation of fuel-vapor/air mixtures into their components and to a device for carrying out this method. The method is suitable, in particular, for the purification of vapor mixtures, such as occur in fuel tanks of motor vehicles.

It is known that fuels are inclined to evaporation as a function of their thermodynamic state. The fuel-vapor/air mixtures, referred to below as gases, which in this case occur in fuel tanks have to be discharged in order to avoid too high a tank internal pressure. Particularly in fuel tanks in motor vehicles, there is the widest possible variety devices for discharging from the fuel tank the gases which occur during operation and during refueling. On account of existing legislation, particularly in the USA, these gases must contain only a defined fraction of hydrocarbons when they are introduced into the atmosphere. These gases are supplied via lines and additional tanks to an activated-charcoal filter, in which the hydrocarbons are filtered out of the gases. The purified gases are subsequently conducted into the atmosphere. As a result of the already low permissible values for the overall vehicle emission of hydrocarbons, present-day activated-charcoal filters already have a considerable overall size, along with all the disadvantages associated with this. In terms of the environmental trend toward ever lower emission limit values in the USA and Europe, the volume of present-day activated-charcoal filters is not sufficient indefinitely.

It is known from JP 11093784 A and U.S. Pat. No. 4,671,071 to arrange in a line between the fuel tank a condenser through which are led gases sucked away from the fuel tank. The condenser is filled with cooled fuel. FR-A-2 724 603 shows a fuel tank, to which are connected a plurality of lines for sucking away and feeding gases from the fuel tank. A compressor and a condenser are arranged in the lines. The fuel-vapor/air mixture is thereby fed from the fuel tank to a preseparator, in which a first separation of fuel constituents and air is carried out, so that the filter is fed with a gas which has substantially lower concentrations of hydrocarbons than is the case in conventional venting devices. The hydrocarbon constituents still present up to then in the gas are subsequently retained in the filter, so that the gas discharged to the atmosphere is essentially free of hydrocarbons.

The object on which the invention is based is, therefore, to provide a method for the purification of fuel-vapor/air mixtures and a device for carrying out the method, by means of which method and device complicated and large-sized filters are avoided.

The object is achieved by means of the features of claims 1 and 11. Advantageous embodiments are described in the subclaims.

By means of the method and the device according to the invention, the fuel-vapor/air mixture is supplied from the fuel tank to a preseparator, in which a first separation of fuel constituents and air is carried out, so that the filter is supplied with a gas which has substantially lower concentrations of hydrocarbons than is the case in conventional venting devices. The hydrocarbon constituents still present up to then in the gas are substantially retained in the filter, so that the gas discharged into the atmosphere is essentially free of hydrocarbons. The critical advantage, in addition to the detectably reduced emission values, is that, instead of the hitherto large-volume and heavy activated-charcoal filter, a filter of considerably smaller volume, which is therefore lighter, can be used. The separation of the fuel constituents is not achieved, as hitherto, by adsorption, but by physical separation, by condensing the hydrocarbons in the preseparator. Furthermore, the mass gas flow to be routed out of the tank system is reduced by the amount of the separated mass vapor flow, so that the tank internal pressure and therefore the line cross sections are reduced, thus improving the refueling capability.

In a first advantageous embodiment of the method according to the invention, the gases occurring are first compressed and subsequently supplied to a condenser, on the condensation surfaces of which the hydrocarbons are transformed by condensation into the liquid phase.

For this purpose, the condensation surfaces of the condenser may be operated via a specific cooling circuit. A specific cooling circuit is not necessary when the condensation surfaces of the condenser are connected to the air-conditioning system. The use of semiconductor cooling elements may, however, also be envisaged.

Via a connection between the condenser and the fuel tank, the liquid phase is returned into the tank, so that the separated fuel constituents can be conveyed to the internal combustion engine. Since compressors and condensers are relatively simply constructed elements, when they are used, the costs of the device are not appreciably higher than in present-day hydrocarbon retention systems.

In an advantageous embodiment, the compressor and condenser forming the preseparator are combined to form a structural unit. The compressed gas mixture consequently has only a short distance to the condenser, with the result that pressure losses can be reduced considerably and the compressor can be made relatively small. Furthermore, it has proved advantageous to arrange a gas separation diaphragm at the outlet of the condenser. The hydrocarbon fraction is further reduced by means of this additional gas separation diaphragm.

It is particularly advantageous to expand the gas mixture before the latter is supplied to the filter. For this purpose, a nozzle or a valve as a throttle and a cyclone are added to the preseparator. The gas accelerated as a result of expansion flows into the cyclone, in which postcondensation takes place. By virtue of the centrifugal force action, condensate is separated and is returned to the fuel tank again via a connection. The further-purified gas has a degree of purity which allows a further reduction of a downstream activated-charcoal filter or possibly by a catalytic burner. Under some circumstances, therefore, an activated-charcoal filter may even be dispensed with completely and, instead, a gas separation diaphragm may be arranged before the gas is introduced into the atmosphere.

For a further reduction in the emission values, it is advantageous to integrate the preseparator into the fuel tank. Since all the connection points of the device according to the invention are therefore also arranged in the fuel tank, these points of increased permeation do not have to be taken into account any further in the design, thus constituting an additional simplification and consequently leading to a further cost reduction. Moreover, as a result of the compact configuration of the preseparator, there is no need for long hose connections.

In a second embodiment of the method according to the invention, the gas occurring during operation or refueling condenses, without previous compression, in a cocondenser. For this purpose, the mixture is lead into a tank which is filled with a liquid cooling medium. The cooling medium used may preferably be fuel. Upon contact with the cool liquid, the hydrocarbons condense, while the purified gas is supplied to a filter via an outlet in the upper part of the cocondenser. The condensed-out constituents are subsequently supplied to the fuel tank again.

To increase the condensation rate, it is advantageous to cool the cooling medium. One possibility is to cool the walls to the condenser. Furthermore, semiconductor cooling elements can be arranged in the condenser. In a further embodiment, the condenser is connected to a cooling circuit. On the one hand, liquid flowing out of the cocondenser is supplied to a cooler before it is supplied at a markedly lower temperature to the cocondenser again. On the other hand, the cocondenser may have arranged in it cooling tubes, through which a cooling liquid flows. This cooler may be a separate cooler which is operated via the air-conditioning system of the vehicle.

Figure 2:
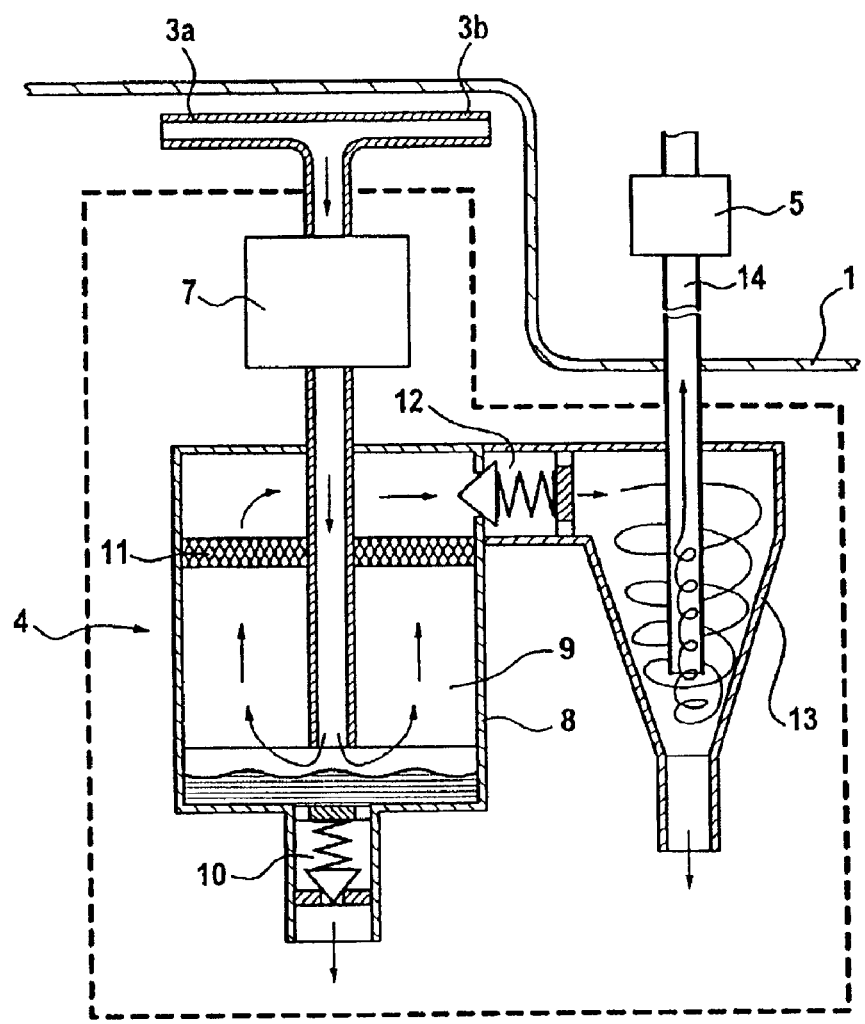
Figure 3:
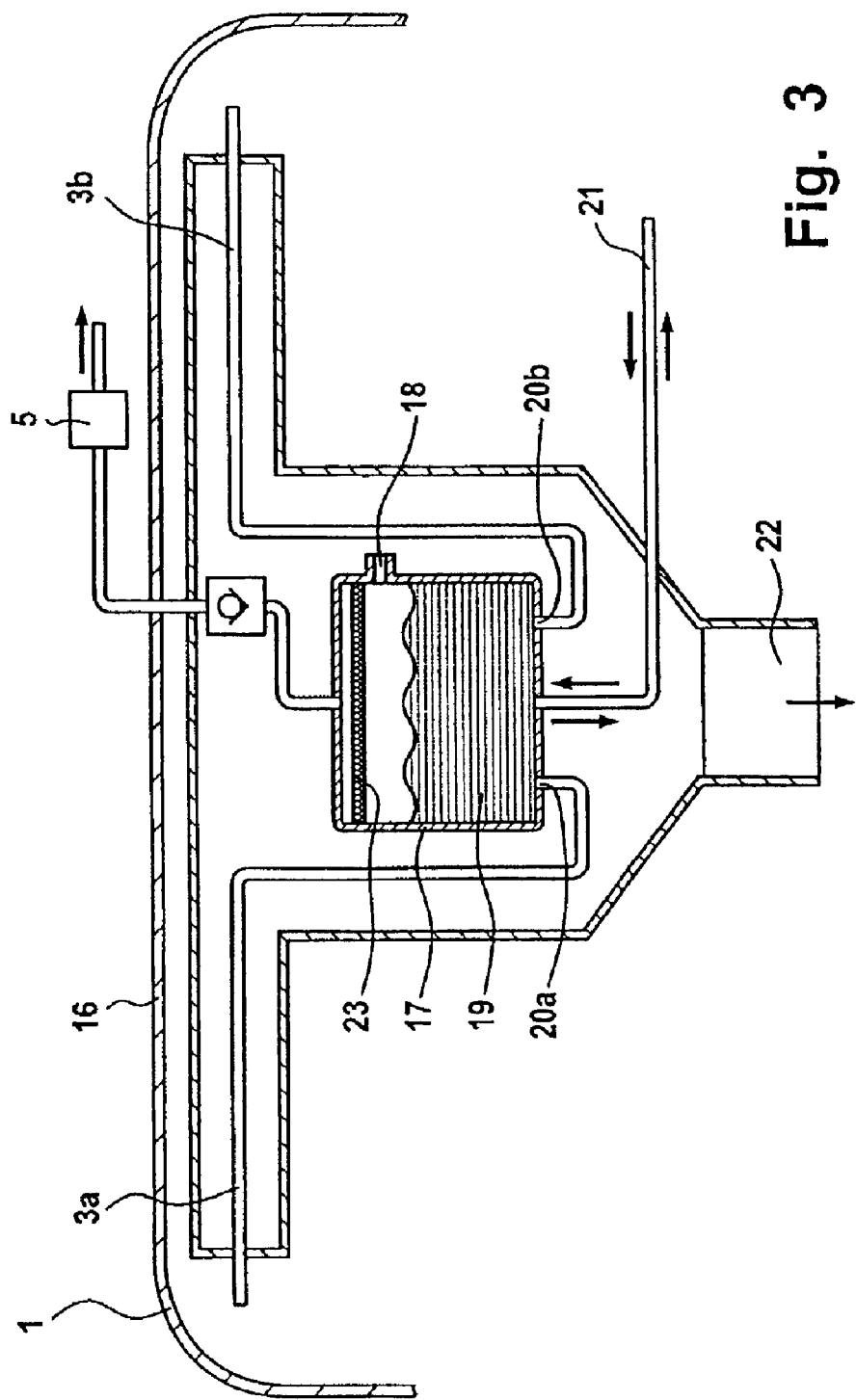

The invention is explained in more detail with reference to a plurality of exemplary embodiments. In the drawing;

FIG. 1 shows a diagrammatic illustration of the device according to the invention, FIG. 2 shows a preseparator with a compression and condensation stage, FIG. 3 shows a preseparator with a cocondenser.

The fuel tank 1, illustrated in FIG. 1, of a motor vehicle is capable of being filled via filler neck 2. For venting during refueling and operation, venting lines 3a, 3b are arranged in the upper region of the fuel tank 1. These venting lines issue into the compensating tank with inner preseparator 4. The gas collected via the venting lines 3a, 3b is supplied to the preseparator 4, the hydrocarbons contained in the gas condensing. The purified gas is subsequently supplied to an activated-charcoal filter 5 before, after second purification in a small activated-charcoal filter, it is led into the atmosphere. The hydrocarbons condensed out in the preseparator 4 are supplied to the fuel tank again via an outlet 6.

The preseparator 4 in FIG. 2 possesses a compression stage 7, in which the gas supplied via the venting lines 3a, 3b is compressed and heated. The compressed gas subsequently flows into a condenser 8. The hydrocarbons contained in the gas mixture condense on the condensation surfaces 9 of said condenser.

The liquid phase collects on the bottom of the condenser 8 and is led into the fuel tank 1 via a valve 10. The gas is expanded by means of a nozzle 12 via a diaphragm 11, at which further hydrocarbons are separated. The then accelerated gas flow contains liquid drops which enter a cyclone 13. By virtue of the centrifugal force, fuel drops are separated on the wall of the cyclone 13. While the liquid phase is led into the fuel tank 1 again, the then purified gas mixture passes via the connection 14 to the activated-charcoal filter 5 arranged outside the fuel tank 1.

The devise illustrated in FIG. 3 shows a detail of a fuel tank 1 with a bubble tank 16 located on the inside in the upper region. The venting lines 3a, 3b reaching into the bubble tank 16 are filled there with a cooling medium 19 by means of a cocondenser 17 as far as the lower edge of an overflow orifice 18. The supply orifices 20a, 20b of the venting lines 3a, 3b are arranged in the bottom region of the cocondenser 17. The constant-temperature stage is reached in the cocondenser 17 via a cooling circuit 21. For this purpose, cooling medium is discharged in a constant mass flow out of the cocondenser 17 and supplied to a heat exchanger. The cooling medium cooled down in this way is subsequently supplied to the cocondenser 17 again.

The fuel 19 condensed out into the cooling medium passes through the overflow 18 on the cocondenser 17 into the bubble tank 16. The pump 22 arranged in the bottom region of the latter conveys the fuel 19 which occurs back into the fuel tank 1, the feed unit or the pump. The remaining gas mixture still accumulating in the upper region of the cocondenser 17 is conducted to the activated-charcoal filter 5, a screen 23 in the region of the cocondenser outlet ensuring that no liquid constituents can arrive at the activated-charcoal filter 5.

What is claimed is:

1. A method for the separation of fuel-vapor/air mixtures of a fuel tank, comprising:
   supplying a gas mixture to be purified from the fuel tank to a first filter;
   supplying the gas mixture to a preseparator;
   separating hydrocarbons from the gas mixture in the preseparator;
   supplying the hydrocarbons to the fuel tank;
   conducting purified gas to the first filter; and
   extracting the gas purified by the preseparator from the fuel tank, wherein the separation of hydrocarbons in the preseparator takes place inside the fuel tank.

2. The method of claim 1, wherein the gas mixture is supplied from the fuel tank to the preseparator via venting lines.

3. The method of claim 1, wherein hydrocarbons included in the gas mixture are condensed in the preseparator.

4. The method of claim 3, wherein the gas mixture in the preseparator is compressed before condensation.

5. The method of claim 4, wherein the gas is expanded after condensation.

6. The method of claim 5, wherein the gas is postcondensed.

7. The method of claim 6, wherein the liquid hydrocarbons separated in postcondensation are conducted into the fuel tank.

8. The method of claim 3, wherein, after condensation, the gas is conducted through a second filter.

9. The method of claim 3, wherein the gas for condensation is conducted through a cooling medium.

10. The method of claim 3, wherein condensation surfaces and a cooling medium are cooled.

11. A device for separating fuel-vapor/air mixtures of a fuel tank, comprising:
    a filter;
    a preseparator; and
    a line from the preseparator to the filter,
    wherein the preseparator is connected to the fuel tank and wherein the preseparator is arranged inside the fuel tank.

12. The device of claim 11, wherein the preseparator is connected to venting lines of the fuel tank for supplying the gas.

13. The device of claim 11, wherein the preseparator is fanned from a compression stage and a first condenser having condensation surfaces.

14. The device of claim 11, wherein a second filter is arranged downstream of a condensation surface in the direction of flow.

15. The device of claim 11, wherein a throttle is arranged at a flow-side outlet of a first condenser.

16. The device of claim 15, wherein the throttle is a valve or a nozzle.

17. The device of claim 11, wherein a second condenser is arranged downstream of a first condenser.

18. The device as claimed in claim 11, wherein a second condenser has a connection to the fuel tank for the discharge of liquid hydrocarbons.

19. The device of claim 11, wherein the preseparator is a cocondenser filled with cooling media.

20. The device of claim 19, wherein venting lines terminate in the lower region of the cocondenser.

21. The device of claim 19, wherein a screen with a drop-impermeable mesh width is arranged at the outlet of the cocondenser to the filter.

22. The device of claim 19, wherein the cocondenser is arranged in a bubble tank.

23. The device of claim 22, wherein the cocondenser possesses an overflow into the bubble tank.

24. The device of claim 11, wherein semiconductor cooling elements are arranged on condensation surfaces, on a cocondenser or in a cooling medium.

25. The device of claim 11, wherein condensation surfaces, a cocondenser or a cooling medium can be cooled by a cooling circuit.

26. The device of claim 11, wherein the filter is an activated-charcoal filter or a gas separation diaphragm.

27. The device of claim 11, further comprising a valve or a pump.

* * * * *